Figure 1:
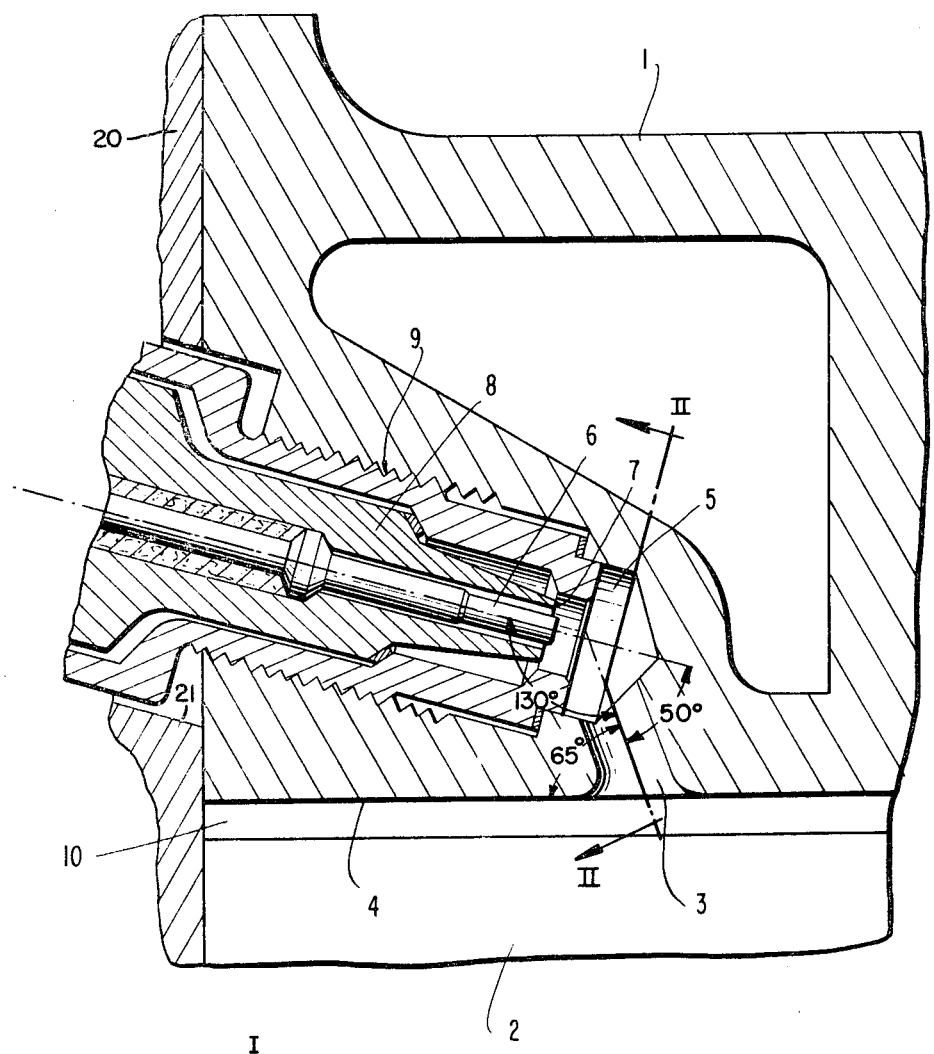

United States Patent [19]

Braun et al.

[11] 3,738,331
[45] June 12, 1973

[54] ROTARY PISTON INTERNAL COMBUSTION ENGINE WITH EXTERNALLY CONTROLLED IGNITION BY MEANS OF A SPARK PLUG

[75] Inventors: Eberhard Braun, Am Katzenbach; Werner Brodbeck, Stuttgart, both of Germany

[73] Assignee: Daimler-Benz Aktiengesellschaft, Stuttgart-Untertuerkheim, Germany

[22] Filed: Apr. 26, 1971

[21] Appl. No.: 137,474

[30] Foreign Application Priority Data
Apr. 24, 1970 Germany.................. P 20 20 007.1

[52] U.S. Cl. ....... 123/8.09, 123/169 R, 123/191 SP
[51] Int. Cl. ....................... F02b 53/12, F02b 23/00
[58] Field of Search.................... 123/8.09, 169 R, 123/191 SP

[56] References Cited
UNITED STATES PATENTS

| | | | |
|---|---|---|---|
| 1,750,063 | 3/1930 | Sorg | 123/191 SP |
| 2,142,280 | 1/1939 | Mock | 123/191 SP X |
| 3,155,085 | 11/1964 | Jones et al. | 123/169 R |
| 3,240,189 | 3/1966 | Stumpfig | 123/8.09 X |
| 3,502,054 | 3/1970 | Hambric | 123/8.09 X |
| 3,597,648 | 8/1971 | Shibagaki et al. | 123/8.09 X |

FOREIGN PATENTS OR APPLICATIONS

| | | | |
|---|---|---|---|
| 1,807,755 | 5/1970 | Germany | 123/8.09 |
| 998,451 | 7/1965 | Great Britain | 123/8.45 |
| 427,266 | 4/1935 | Great Britain | 123/148 C |
| 586,737 | 4/1925 | France | 123/191 SP |

*Primary Examiner*—Allan D. Herrmann
*Attorney*—Craig, Antonelli & Hill

[57] ABSTRACT

A rotary piston internal combustion engine with applied ignition by means of a spark plug within an ignition pre-chamber, especially of trochoidal construction, which essentially consists of a casing housing and of a polygonal piston rotating within the same which slides along a multi-arched inner casing running surface and over the orifice of a firing channel whereby a straight line extending in a cross-direction to the casing housing intersects both the center longitudinal axis of the spark plug as also the center longitudinal axis of the firing channel in the ignition pre-chamber in front of the center electrode of the spark plug.

10 Claims, 2 Drawing Figures

INVENTORS
EBERHARD BRAUN
WERNER BRODBECK

BY Craig, Antonelli, Stewart & Hill

ATTORNEYS

ROTARY PISTON INTERNAL COMBUSTION ENGINE WITH EXTERNALLY CONTROLLED IGNITION BY MEANS OF A SPARK PLUG

The present invention relates to a rotary piston internal combustion engine with applied or externally controlled ignition by means of a spark plug within an ignition pre-chamber, especially of trochoidal construction, essentially consisting of a casing housing and of a polygonal piston rotating within the same, which slides along a multi-arched internal casing running or contact surface and over the orifice of a firing channel.

The requirements made heretofore of the spark plug as regards the pressures occurring in the engine, the completely satisfactory gas seal at all temperatures, the prevention of a glow ignition and the insensitivity of the insulator body of the ignition plug against abrupt temperature fluctuations were sufficient to assure a delay-free operating cycle of the engine. However, since with increasing power output of highly loaded engines and of the increasing thermal loads of the drive unit of an internal combustion engine connected therewith, especially of a rotary piston internal combustion engine, the hitherto made arrangement of the spark plug, for example, the known arrangement in which the spark plug firing channel is directed toward the center of the spark plug, is no longer adequate for and able to cope with the present-day requirements, it is the aim of the present invention to eliminate these disadvantages with simple means and in an excellent manner.

Accordingly, it is proposed according to the present invention that a straight line extending in a cross-direction to the casing housing perpendicularly to the longitudinal center plane of the spark plug intersects both the center longitudinal axis of the spark plug as also the center longitudinal axis of the firing channel in the ignition pre-chamber in front of the center electrode of the spark plug.

It is assured with this type of construction according to the present invention that the hot combustion gases do not impinge against the electrode so that a thermal value of the spark plug is assured that lies considerably below the values customary heretofore.

In an advantageous embodiment of the present invention, the firing channel arranged in the casing housing may form an angle of about 65° in the axial direction of the engine with respect to the line of its trochoidal running surface, as viewed in axial cross section including the longitudinal center axis of the firing channel.

In a preferred embodiment of the present invention, the center longitudinal axes of the spark plug and the firing channel—as viewed in the cross-direction to the casing housing—may be arranged to one another at an angle of inclination of about 50°.

Accordingly, it is an object of the present invention to provide a rotary piston internal combustion engine with external ignition by means of a spark plug which avoids by simple means the aforementioned shortcomings and drawbacks encountered heretofore.

Another object of the present invention resides in a rotary piston internal combustion engine with applied ignition using a spark plug, which completely satisfies all requirements as regards pressures, gas seal, prevention of glow ignition, etc., in high power output engines.

Still another object of the present invention resides in a rotary piston internal combustion engine of the type described above which assures relatively low thermal values of the spark plug.

Figure 2:
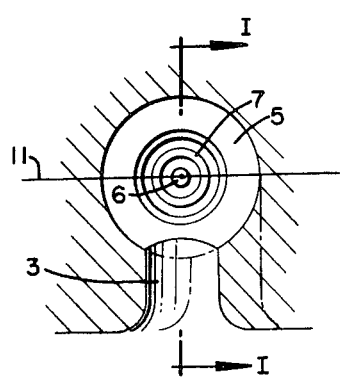

These and further objects, features and advantages of the present invention will become more obvious from the following description when taken in connection with the accompanying drawing which shows, for purposes of illustration only, one embodiment in accordance with the present invention, and wherein:

FIG. 1 is a partial cross-sectional view through a rotary piston internal combustion engine of trochoidal construction in accordance with the present invention, the plane of cross section of FIG. 1 containing the longitudinal axes of the spark plug and of the firing channel and being taken along line I—I of FIG. 2, and FIG. 2 is a partial cross-sectional view taken along line II—II of FIG. 1.

Referring now to the two figures of the drawing, the rotary piston internal combustion engine of trochoidal construction illustrated in this figure essentially consists of a conventional casing housing 1, of a polygonal piston 2 supported on an eccentric of an eccentric shaft (not shown) and of lateral housing parts of which only the lateral housing part 20 is shown in FIG. 1. The piston 2 which rotates within the casing housing 1 slides over an orifice or discharge aperture of a firing channel 3 arranged in the casing housing 1. This firing channel 3 whose center longitudinal axis forms an angle of about 65° with respect to the running or contact surface 4 of the casing housing 1 and an angle with respect to the center longitudinal axis of the spark plug 9, terminates in an ignition pre-chamber 5, in which also terminate a center electrode 6 and the bottom 7 of an insulating body 8 of the spark plug 9 screwed into the casing housing 1. The spark plug 9 extends through an aperture 21 in the lateral part 20 (or intermediate part of the multi-disk engine) at an inclination forming an angle of 50° with respect to the longitudinal center axis of the firing channel 3, is accessible through apertures in the lateral parts, possibly in case of a multi-disk type of construction, in the intermediate parts, and thus projects laterally into the casing through a lateral (intermediate) part 20 generally in the axial direction of the engine with a slight downward inclination as described above. The firing channel 3 which connects the spark plug center electrode 6 with the working chamber 10 is so arranged in relation to the spark plug 9 that the two center longitudinal axes intersect on a straight line 11 (FIG. 2) extending in the cross-direction to the casing housing 1, i.e., perpendicularly to the plane of the drawing of FIG. 1 and thus to the longitudinal center plane of the spark plug 9 and of the firing channel 3, in front of the center electrode 6 within the ignition pre-chamber 5 in order to prevent a direct impingement on the insulating body 8 and on the center electrode 6 by the hot combustion gases.

While we have shown and described only one embodiment in accordance with the present invention, it is understood that the same is not limited thereto but is susceptible of numerous changes and modifications as known to those skilled in the art and we therefore do not wish to be limited to the details shown and described herein, but intend to cover all such changes and modifications as are encompassed by the scope of the appended claims.

We claim:

1. A rotary piston internal combustion engine with externally applied ignition by a spark plug means in an ignition pre-chamber, which includes a casing housing means and a polygonal piston means rotating within the casing housing means, said piston means sliding along a multi-arched inner-casing contact surface means and over the discharge orifice of a firing channel means, and said spark plug means including a center electrode, characterized in that the longitudinal axes of said spark plug means and of said firing channel means are disposed non-parallel to one another, and in that a straight line extending perpendicularly to the center longitudinal planes of the spark plug means and of the firing channel means intersects both the center longitudinal axis of the spark plug means as also the center longitudinal axis of the firing channel means in the ignition pre-chamber in front of the center electrode of the spark plug means.

2. A rotary piston internal combustion engine according to claim 1, characterized in that the firing channel means arranged in the casing housing means has an angle of about 65° in the axial direction of the engine.

3. A rotary piston internal combustion engine according to claim 2, characterized in that the center longitudinal axes of the spark plug means and of the firing channel means, as viewed in cross-direction to the casing housing means, subtend an angle of about 130°.

4. A rotary piston internal combustion engine according to claim 3, characterized in that the engine is of trochoidal construction.

5. A rotary piston internal combustion engine according to claim 1, characterized in that the center longitudinal axes of the spark plug means and of the firing channel means, as viewed in cross-direction to the casing housing means, subtend an angle of about 130°.

6. A rotary piston internal combustion engine according to claim 1, characterized in that the engine is of trochoidal construction.

7. A rotary piston internal combustion engine according to claim 3, characterized in that the spark plug means projects laterally into the casing housing means.

8. A rotary piston internal combustion engine according to claim 1, characterized in that the spark plug means projects laterally into the casing housing means.

9. A rotary piston internal combustion engine according to claim 8, in which the housing casing means is adjoined laterally by lateral housing means, said spark plug means projecting laterally into said housing casing means generally in the axial direction of the engine through an aperture provided in a respective lateral housing means.

10. A rotary piston internal combustion engine with externally applied ignition by a spark plug means in an ignition pre-chamber, which comprises a housing means including a housing casing and lateral housing means, a polygonal piston means rotating within said housing casing means and sliding along a multi-arched inner-casing running surface means of the casing means over the discharge orifice of a firing channel means, and said spark plug means including a center electrode, characterized in that said spark plug means projects laterally into the housing casing means through a respective lateral housing means, and in that a straight line extending substantially perpendicularly to the center longitudinal planes of the spark plug means and of the firing channel means intersects both the center longitudinal axis of the spark plug means as also the center longitudinal axis of the firing channel means in the ignition pre-chamber in front of the center electrode of the spark plug means, and said two longitudinal axes being non-coincidental with respect to one another.

* * * * *